May 26, 1942.  C. W. GANNETT  2,284,275
LIFT TRUCK
Filed June 4, 1938  2 Sheets-Sheet 2
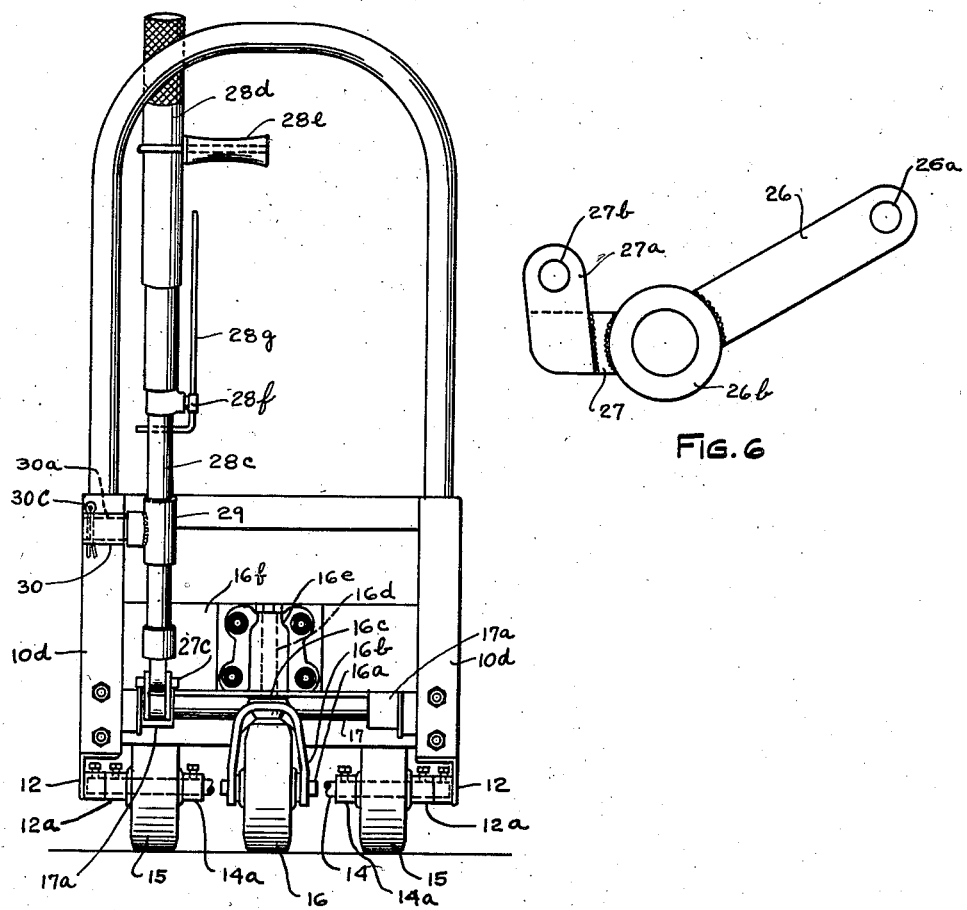
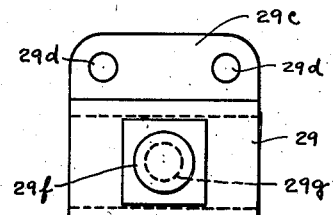
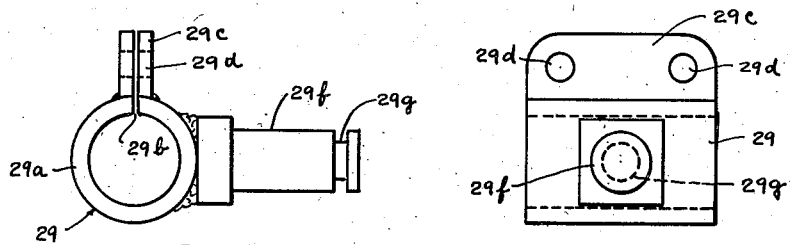
INVENTOR.
Chauncey W. Gannett
BY
Frank M. Slough
ATTORNEY.

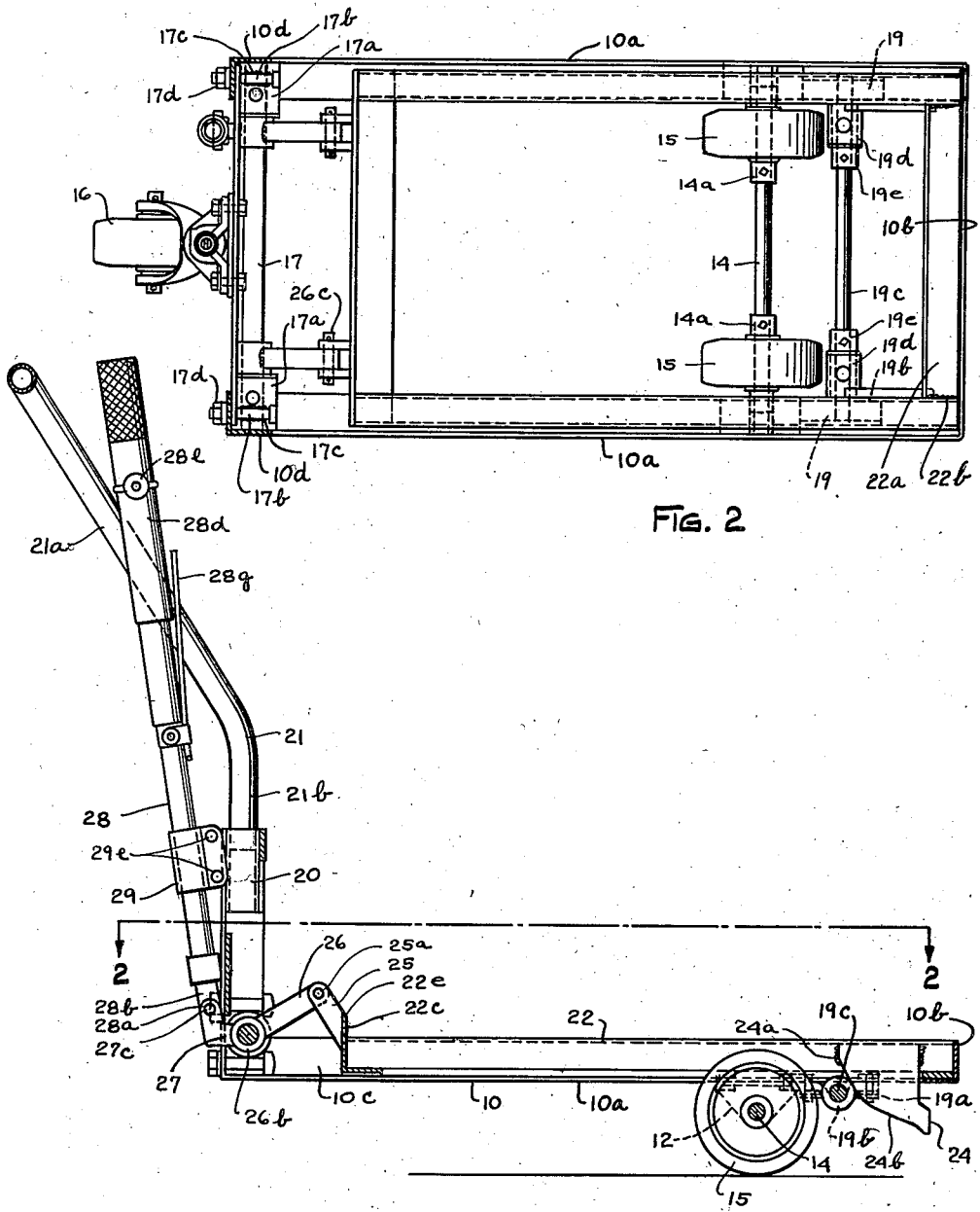

Patented May 26, 1942

2,284,275

UNITED STATES PATENT OFFICE 2,284,275

LIFT TRUCK

Chauncey W. Gannett, Wellington, Ohio, assignor to Wellington Machine Company, Wellington, Ohio, a corporation of Ohio Application June 4, 1938, Serial No. 211,965

3 Claims. (Cl. 254—5)

This invention relates generally to the type of devices known as lift trucks and is more particularly directed to trucks of the "pull and lift" type arranged to be moved under a low platform on which the load has been placed for lifting the loaded platform for transportation from place to place.

An object of the invention is to provide a truck of this character utilizing hydraulic means to raise and lower the load, wherein the load is raised by a step-by-step movement and lowered by a gradual continuous cushioned movement.

Another object of the invention is to provide a truck utilizing hydraulic means with separate handle means whereby the truck can be pushed or pulled with equal ease.

Another object of the invention is to provide hydraulic means in a truck of the class described which will be self-contained and elevate and lower the load independently of the operating handle for the truck.

Another object of the invention is to provide a novel link mechanism for simultaneously moving relatively movable parts of the truck both vertically and longitudinally.

Another object of the invention is to dispose the hydraulic means, together with its actuating and control mechanism, within easy access of the operator and preferably adjacent the fixed manipulating handle of the truck.

Another object of the invention is to provide a truck of this character wherein a movable main frame carries a lifting frame through linkage operably connected to hydraulic actuating means for moving the lift frame in a combined vertical and longitudinal direction with respect to the main frame.

A further object of the invention is to provide an improved truck of the type referred to which will be simple in operation and inexpensive in production.

A still further object of the invention is to provide an improved truck which will operate in more limited space than trucks of the prior art and wherein the operator is not hampered in elevating the load.

Other objects of the invention and the invention itself will become increasingly apparent from the following description and drawings wherein:

Fig. 1 is a vertical longitudinal sectional view of a form of the invention;

Fig. 2 is a horizontal sectional view taken substantially on a line 2—2 of Fig. 1;

Fig. 3 is an end view of the truck shown in Fig. 1;

Fig. 4 is a plan view of a support for the hydraulic actuating means forming a part of the invention;

Fig. 5 is an end view of the support shown in Fig. 4, and

Fig. 6 is a side view of one of the link members for movably supporting the load platform.

Referring to the drawings, the truck body or frame is generally rectangular and comprises a member 10 of angular cross section formed to provide a pair of substantially horizontal longitudinal portions 10a—10a, and a lateral cross member 10b, arranged to provide upwardly extending flange portions 10c. The ends of the member 10 extend upwardly and provide a pair of generally vertical portions 10d—10d at the end of the frame opposite the cross member 10b. Although the member 10 is preferably formed from a single piece of angle stock, it could obviously be made of separate members suitably secured together, as by welding.

Depending from the frame portions 10a—10a are angle brackets or bearing hangers 12—12 to the lower ends of which are secured, as by welding, collars or bearings 12a—12a arranged in opposed relation to fixedly receive the extremities of an axle 14. Rotatably mounted on the axle 14 adjacent the collars 12a—12a are a pair of wheels 15—15 located longitudinally of the axle by means such as a plurality of collars 14a. At the opposite end of the truck from the wheels 15—15 is a third or pivotally supported steering wheel 16 mounted on a stub axle 16a carried by the depending arms 16b of a stem caster element 16c. A stem 16d of the caster is rotatable in a bearing bracket 16e secured to a caster support 16f in turn fixed to the vertical portions 10d—10d above a laterally disposed lever shaft 17. The support 16f is preferably welded to the vertical portions 10d—10d to connect the otherwise open end of the main frame 10.

Adjacent the opposite sides of the frame 10, at the base of the vertical portions 10d—10d, are positioned sleeves 17a—17a arranged to receive the extremities of the lever shaft 17. The sleeves 17a—17a are secured to the vertical portions 10d—10d by bolts 17b—17b, the shank portions of which are welded to opposite sides of the sleeves as at 17c, and the threaded ends of which project through apertures in the vertical portions 10d—10d, and secured therein by nuts 17d.

A pair of hangers 19—19 are secured to the frame portions 10a—10a adjacent the hangers 12—12, and comprise strap members 19a—19a formed with oppositely disposed U-portions 19b—19b to provide bearing surfaces for the extremities of a laterally disposed shaft 19c. Mounted upon the shaft 19c and inwardly from the frame members 10a—10a are sleeves 19d—19d mounted upon suitable anti-friction bearings carried by the shaft 19c and positioned by means such as collars 19e—19e.

Secured to the upper ends of vertical portions

10d—10d are socket members 20 of tubular form which receive the ends of an inverted U-shaped handle member 21, also of tubular cross section. The handle 21 has an angularly disposed portion 21a, adjacent a socket engaging portion 21b, which extends outwardly from one end of the truck frame. Thus, the bight of the handle is disposed within easy access of the operator, and as the handle is located above the steering wheel 16, it will be noted that the truck is readily pushed, pulled, or otherwise manipulated thereby. Due to the free pivotal movement of the wheel 16, as well as the clearance provided between the wheel and the truck frame, both forward and rearward, as well as turning, movement of the truck is provided.

A lifting frame or load carrying means is mounted generally horizontally adjacent the truck frame on means hereinafter described, which enable such means, or platform as it is frequently called, to be moved vertically and longitudinally with respect to the truck. The platform comprises a frame structure including a pair of generally horizontal rails 22 which extend longitudinally of the frame portions 10a—10a, and closely parallel thereto, and which are of generally square tubular cross section. A cross support 22a connects the ends of the rails 22, being preferably welded thereto as at 22b. The other ends of the rails are connected by an angle cross member 22c arranged so that an upwardly extending flange 22e extends above the rails to provide a stop for a purpose hereinafter appearing.

Cam members 24—24 are secured to the inner opposed faces of the rails 22, as by the welds 24a, and project downwardly adjacent the cross member 22a. The cams have cam surfaces 24b in engagement with the bearing sleeves 19d, surfaces 24b being formed so that the cam members ride upwardly and longitudinally upon similar movement of the platform. The curvature of the surfaces 24b is such that, irrespective of the position of the load lifting platform with respect to the main frame, a support is provided for that end of the platform.

Preferably welded to a face of the flange 22e are spaced pairs of arms 25—25, which extends upwardly therefrom at an acute angle thereto. The outer ends of the arms 25 are apertured as at 25a in register with apertures 26a provided adjacent the ends of a pair of levers 26 rigidly secured as by welding to one side of the collars or sleeves 26b—26b, surrounding the lever shaft 17, and fixed adjacent the opposite ends thereof. Pins 26c—26c are projected through the apertures 25a and 26a to provide a pivotal connection between the arms 25 and levers 26. As more clearly shown in Fig. 6, at the opposite side one of the collars 26b has a lever 27 welded thereto to normally lie in a generally horizontal position. A link or arm 27a is welded to each side of the lever 27, and extends generally upwardly, apertures 27b being provided therein.

Suitable means are provided in the form of a hydraulic pump or jack which is illustrated generally at 28, and connected to arms 27a to oscillate the levers 26 in a manner to be described. An aperture 28a, adapted to register with aperture 27b, is provided in a ram 28b forming a part of the jack 28. A pin 27c projects through the apertures 27b and 28a to pivotally connect the jack 28 to the arms 27a, so that movement of the ram 28b is transmitted to the lever 26 connected thereto.

The bell crank structures above described serve as means for pivotally or hingingly connecting the main frame and platform to lift and move the platform when force is exerted downwardly on the lever 27 on one of the cranks by the ram 28b. The crank members are fixed to the lever shaft 17 by means of screws or the like. Thus, movement of the lever 27 and its sleeve 26b, in response to movement of the ram 28b, is transmitted to both of the cranks which move in unison and cooperate not only to lift and lower the platform but also to move it longitudinally with respect to the main frame.

The pump or jack 28 may be of any suitable type, the details of which form no part of the present invention. The jack is generally of elongated tubular form having an operating handle 28d, and is supported adjacent one arm of the handle 21 in the following manner.

As illustrated in Figs. 4 and 5, a bracket 29 comprising a tubular section 29a split longitudinally at 29b and provided with ears 29c apertured at 29d to receive tightening bolts 29e, embraces the cylindrical chamber 28c of the jack. Preferably welded to one side of the section 29a is a generally cylindrical arm 29f recessed as at 29g. The arm 29f projects toward the arm of the handle 21, and is secured in a bracket support or block 30 welded to the adjacent vertical frame section 10d. The support 30 has a bore 30a therethrough for pivotally receiving the arm 29f. A cotter pin 30c projects through a second bore in the support 30 and engages the recess 29g to retain the arm 29f in the support, as will be readily understood. Thus, a secure mounting is provided for the jack, which is capable of being disconnected should it be desired to remove the jack for any reason.

Relative movement between the handle 28d and the cylinder 28c builds up hydraulic pressure in the cylinder, as will be readily understood, causing downwardly movement of the ram 28b. If desired, a horizontally disposed handle 28e may be secured to the handle 28d to aid the operator to reciprocate the latter. Downward movement of the ram 28b is transmitted to the arm 27, which rotates the sleeves 26b in a counter-clockwise direction as viewed in Fig. 1. The end of the lever 26 is thus moved arcuately about the axis of the shaft 17 and through arms 25 simultaneously raises the platform and moves the same longitudinally in a direction toward the handle 21. To lower the platform, the sleeves 26b and associated mechanism are moved in the opposite direction, and to accomplish this, a needle valve (not shown) controlled by an arm 28f is opened to by-pass the fluid in the jack cylinder which permits the ram to move upwardly and return to its normal position. For the convenience of the operator, an elongated handle or lever 28g is secured to the arm 28f to operate the valve.

From the foregoing, the operation of the truck will be readily understood so only a brief description thereof is necessary. The load to be carried by the truck is generally placed upon a suitable platform elevated slightly from the floor. The truck with its lifting platform in lowered position is moved beneath the loaded platform until an edge thereof is in engagement with the stop provided by the flange 22e. The jack handle 28d is then reciprocated to move the ram 28b downwardly. Downward movement of the ram is transferred to arcuate movement of the lever 26 connected thereto, through the arm 27 and sleeve 26b. The other lever 26 is simultaneously moved by the shaft 17, and a combined longitudinal and vertical lifting movement is imparted to the lifting frame or platform. During such movement, the other end of the lifting frame is movably supported by the cams 24 riding upon the sleeves 19d. The impulses imparted by the operator to the handle 28d impart a series of step-by-step movements of the lifting frame as it is being raised by the hydraulic means.

The truck and its load is then moved to the desired location and the platform is gradually lowered in a continuous downward and longitudinal movement by opening the needle valve by means of the handle 28g to by-pass the fluid and permit the ram 28b to move upwardly, and thereby move the levers 26 arcuately in a reverse direction. The resistance offered the bypassed fluid causes a cushioning action upon the lifting frame as it moves downwardly, so that the platform is lowered without shock.

It is to be noted that the operation of the handle member 21 is independent of the operation of the lifting mechanism and performs only the function of controlling the movement of the truck. It is rigidly attached to the truck frame as described and can be pushed or pulled with equal ease.

The lifting mechanism consisting of the jack 28 and linkage 25 described operate independently of the operation of the handle and the operator is not hampered thereby in elevating a load.

In numerous prior art devices with which I am familiar, pull tongues or handles are used which swing in a vertical arc to lift the load and release means for lowering the same are generally provided by levers located close to the pulling end of the pull handles or tongues. The improved truck of my invention omitting such protruding members operates in more limited space than such trucks and the operator is not hampered in elevating or lowering the load.

Although I have shown and described certain modifications of my invention, I contemplate that numerous and extensive departures may be made therefrom without departing from the spirit of my invention and the scope of the appended claims.

What I claim is:

1. In a lift truck, a rectangular frame member, a handle secured to said frame member, a pair of rails having their extremities interconnected and forming a loading platform, lever means pivotally secured to the rear portion of said frame member, said platform having an upwardly extending rear flange which extends above the rails to form a stop for loading said platform and to form a forward point of attachment for said lever means, hydraulic pump means vertically disposed at the rear of said frame member, said lever means being secured to said hydraulic pump means and said rear flange, cam elements disposed on opposite sides of the inner faces of the rails adjacent their forward end, bearing surfaces carried by the forward end of said frame beneath said cam elements and engageable thereby, said platform being positioned upon said frame whereby said frame is adapted to form a base for said platform when said platform is in its lowered position and said cam elements are adapted to ride on said bearing surfaces, whereby, when movement is imparted to said rear flange of said platform by said hydraulic pump means through said lever means, said platform is vertically raised or lowered with respect to said frame and moved either rearwardly or forwardly, in a longitudinal direction with respect to said frame, said longitudinal and vertical movements being concurrent.

2. In a lift truck, a rectangular frame member, a handle secured to said frame member, a pair of rails having their extremities interconnected and forming a loading platform, a pair of levers pivotally secured to the rear portion of said frame member, said platform having an upwardly extending rear flange which extends above the rails to form a stop for loading said platform and to form a forward point of attachment for each of said levers for securing the platform to the rear portion of said frame, hydraulic pump means disposed at the rear of said frame member, said levers adapted to operate together by means of a shaft connecting said levers and disposed rearwardly of said platform, said shaft being secured to an arm having pivotal connection with said hydraulic means, cam elements disposed on opposite sides of the inner faces of the rails adjacent their forward end, bearing surfaces carried by the forward end of said frame beneath said cam elements and engageable thereby, said platform being positioned upon said frame whereby said frame is adapted to form a base for said platform when said platform is in its lowered position and said cam elements are adapted to ride on said bearing surfaces whereby, when movement is imparted to said rear flange of said platform by said hydraulic pump means through said lever means and said pivot connection, said platform is vertically raised or lowered with respect to said frame and moved either rearwardly or forwardly in a longitudinal direction with respect to said frame, said longitudinal and vertical movement being concurrent.

3. In a lift truck, a rectangular frame member, a handle secured to said frame member, a pair of rails having their extremities interconnected and forming a loading platform, lever means pivotally secured to the rear portion of said frame member, said platform having an upwardly extending rear flange which extends above the rails to form a stop for loading said platform and to form a forward point of attachment for said lever means, hydraulic pump means vertically disposed at the rear of said frame member, said lever means being secured to said hydraulic pump means and said rear flange, cam elements disposed on opposite sides of the inner faces of the rails adjacent their forward end, bearing surfaces carried by the forward end of said frame beneath said cam elements and engageable thereby, said platform being positioned upon said frame whereby said frame is adapted to form a base for said platform when said platform is in its lowered position and said cam elements are adapted to ride on said bearing surfaces, said hydraulic means extending substantially upwardly from the plane of said frame, whereby upon movement of said pump means arcuate movement of said lever members is secured whereby said platform is vertically raised or lowered with respect to said frame and moved either rearwardly or forwardly in a longitudinal direction with respect to said frame, said longitudinal and vertical movements being concurrent.

CHAUNCEY W. GANNETT.